United States Patent
Hermstein et al.

[15] 3,675,123
[45] July 4, 1972

[54] DEVICE FOR MEASURING CURRENTS IN A HIGH VOLTAGE CONDUCTOR BY MODULATED RADIATED BEAMS

[72] Inventors: Wolfgang Hermstein; Klaus Mollenbeck, both of Berlin, Germany

[73] Assignee: Siemens Aktiengesellschaft, Berlin, Germany

[22] Filed: Aug. 5, 1970

[21] Appl. No.: 61,064

[30] Foreign Application Priority Data

Aug. 6, 1969  Germany .......................P 19 40 614.5

[52] U.S. Cl. ............................................................324/96
[51] Int. Cl. .................................G01r 19/00, G01r 31/00
[58] Field of Search ...................324/96, 127, 58.5 B, 58.5 C; 340/189, 207; 250/199; 332/30

[56] References Cited

UNITED STATES PATENTS

| | | | |
|---|---|---|---|
| 3,506,833 | 4/1970 | Von Willisen | 250/199 |
| 3,569,835 | 3/1971 | Harner | 340/207 X |
| 3,335,367 | 8/1967 | Skooglund et al. | 324/96 |
| 3,159,801 | 12/1964 | Wiedemann | 332/30 V |

Primary Examiner—Gerard H. Strecker
Attorney—Curt M. Avery, Arthur E. Wilfond, Herbert L. Lerner and Daniel J. Tick

[57] ABSTRACT

A modulation device at a high voltage has a reflector for reflecting high frequency oscillations in accordance with the magnitude of the current to be measured. The reflector has resonant characteristics corresponding to the magnitude of the current to be measured. A transmitter transmits high frequency oscillations to the reflector. A receiver converts the reflected oscillations to signals corresponding to the magnitude of the current to be measured.

9 Claims, 4 Drawing Figures

Fig. 2

DEVICE FOR MEASURING CURRENTS IN A HIGH VOLTAGE CONDUCTOR BY MODULATED RADIATED BEAMS

DESCRIPTION OF THE INVENTION

The invention relates to a device for measuring currents in a high voltage conductor. More particularly, the invention relates to a device for measuring currents in a high voltage conductor and for transmitting the measured values from a high voltage side of the device to a low voltage side of the device. Oscillations are modulated at a high frequency in a modulating device at the high voltage side of the device.

In a known current measuring device of the type of the invention, linearly polarized microwave beams are transmitted to a waveguide via a ferrite rod, which rotates the plane of polarization of the microwaves in accordance with the magnitude of the current to be measured in the high voltage conductor. The modulated microwaves are subsequently reflected to the low voltage side of the device, where they are demodulated and converted into a measurement magnitude or signal proportional to the magnitude of the current to be measured in the high voltage conductor.

The principal object of the invention is to provide a new and improved device for measuring currents in a high voltage conductor.

An object of the invention is to provide a device for measuring currents in a high voltage conductor, which device utilizes only passive circuit components as a reflector at the high voltage side of the device, so that operating voltages are not required at the high voltage side to determine the measured magnitudes, and the output required for operating the device is low and the maintenance and servicing of the device are considerably simplified.

An object of the invention is to provide a device for measuring currents in a high voltage conductor, which device need not have insulated or encapsulated transmission paths for protection from the free atmosphere, and may therefore be utilized in the open air.

An object of the invention is to provide a device for measuring currents in a high voltage conductor, which device functions with efficiency, effectiveness and reliability.

In accordance with the invention, a device for measuring currents in a high voltage conductor and for transmitting the measured values from a high voltage side of the device to a low voltage side of the device comprises a modulation device at the high voltage side of the device. The modulation device has reflector means for reflecting high frequency oscillations in accordance with the magnitude of the current to be measured. The reflector means has resonant characteristics corresponding to the magnitude of the current to be measured. A transmitter transmits high frequency oscillations to the reflector means of the modulation device. A receiver converts the oscillations reflected by the reflector means of the modulation device to signals corresponding to the magnitude of the current to be measured.

A high voltage conductor conducts the current to be measured. The reflector means of the modulation device comprises a resonant circuit coupled to the high voltage conductor and has a resonant frequency which varies in accordance with the magnitude of the current to be measured, and a reflector connected to the resonant circuit.

The resonant circuit of the reflector means of the modulation device includes a capacitance diode having a capacitance which varies in accordance with the magnitude of the current to be measured thereby varying the resonant frequency of the resonant circuit in accordance with the magnitude of the current to be measured. Rectifier means couples the capacitance diode of the resonant circuit of the reflector means of the modulation device to the high voltage conductor thereby coupling the capacitance diode to a voltage proportional to the current to be measured.

A saturation converter energized by the current to be measured may be utilized to provide a constant auxiliary voltage for determining the working point of the capacitance diode of the resonant circuit.

The transmitter may comprise a warble transmitter at the low voltage side of the device having a sampling frequency determined by the desired accuracy of measurement.

The transmitter transmits high frequency oscillations having a fixed frequency and the reflector means of the modulation device reflects the high frequency oscillations received from the transmitter as a main radiation having the fixed frequency and as a sideband radiation having a frequency corresponding to the current to be measured.

The high frequency oscillations may be transmitted by the transmitter directly and unmodulated to the receiver and the receiver demodulates the oscillations reflected by the reflector means of the modulation device by mixing with the oscillations directly transmitted thereto from the transmitter.

The high frequency oscillations transmitted and reflected in the current measuring device of the invention are in the decimeter, centimeter and millimeter range. The reflector means may be designed in various ways. As hereinbefore described, the reflector means preferably comprises a reflector having an electrical oscillating or resonant circuit electrically connected thereto, the resonant frequency of which circuit varies in accordance with the current to be measured. The variation in the resonant frequency of the resonant or oscillating circuit, in accordance with the current to be measured, is preferably effected by a capacitance diode which varies in capacitance in accordance with the current to be measured. The capacitance diode of the resonant circuit is coupled to a voltage proportional to the current to be measured via, for example, a diode. Since, however, only one half-wave of an alternating current to be measured may be evaluated when a single diode is utilized, two oscillating or resonant circuits may be connected in series with the reflector in order to provide a complete measurement of an alternating current. This results in a high expenditure. It is therefore preferable to connect the capacitance diode to the voltage proportional to the current to be measured via a double path rectifier circuit. This permits both half-waves of an alternating current to be measured in a relatively simple manner.

The reflector means of the current measuring device of the invention requires no auxiliary voltage. If a particularly large working area is to be measured with great accuracy, however, particularly including low instantaneous magnitudes of the current to be measured, an auxiliary voltage may be utilized to appropriately place the working point of the capacitance diode. The auxiliary voltage is preferably provided by a saturation converter which is energized or excited by the current to be measured.

As hereinbefore described, the transmitter preferably comprises a warble transmitter at the low voltage side of the device having a sampling frequency which is determined by the desired accuracy of measurement. The frequency of the high frequency oscillations transmitted by the warble transmitter and reflected by the reflector means preferably is the resonant frequency of the reflector means, since the resonant frequency of the reflector means varies in accordance with the magnitude of the current to be measured. The receiver may thus include a demodulator which produces a measured magnitude or signal corresponding to the magnitude of the current to be measured, from the reflected frequency spectrum.

In the current measuring device, as hereinbefore described, wherein the transmitter transmits high frequency oscillations having a fixed frequency and the reflector means of the modulation device reflects the high frequency oscillations received from the transmitter as a main radiation having the fixed frequency and as a sideband radiation having a frequency corresponding to the current to be measured, only the sideband radiation is demodulated from the reflected frequency spectrum at the receiver. When the high frequency oscillations transmitted by the transmitter are also directly transmitted to the receiver, as hereinbefore described, the demodulation in the receiver is facilitated by any suitable demodulating process which utilizes such directly transmitted oscillations such as, for example, mixing or compensating.

In order that the invention may be readily carried into effect, it will now be described with reference to the accompanying drawing, wherein.

Figure 1:
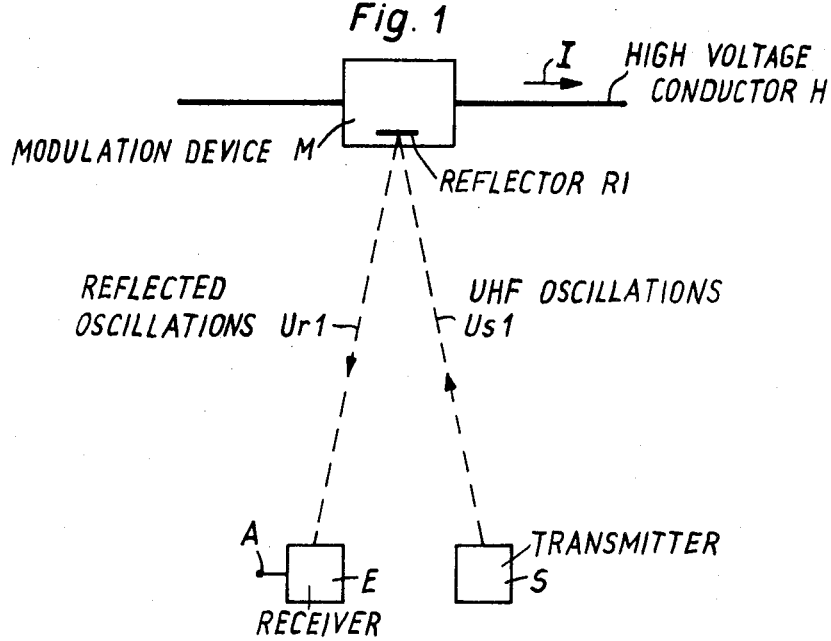
FIG. 1 is a schematic block diagram of an embodiment of the device of the invention for measuring currents in a high voltage conductor.

In FIG. 1, a transmitter S is provided at the low voltage side of the device and transmits, for example, UHF oscillations $Us1$ to a modulation device M connected in a high voltage conductor H. A current I flows through the high voltage conductor H and is the current to be measured.

The current I charges the modulation device M and controls the operation of a reflector R1 of said modulation device in accordance with the reflection characteristics of said reflector. Consequently, the UHF oscillations $Us1$ are modulated by the reflector R1 and the reflected modulated oscillations $Ur1$ are reflected from said reflector to the low voltage side of the device and are received by a receiver E. The receiver E converts the reflected modulated oscillations $Ur1$ to measured magnitudes of signals corresponding to the magnitude of the current I to be measured in the high voltage conductor H.

Figure 2:
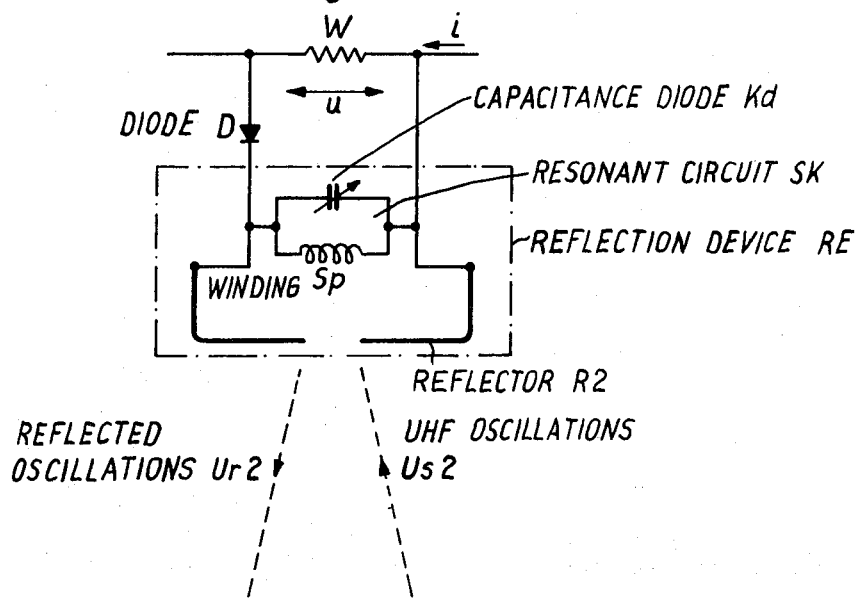
FIG. 2 is a schematic block diagram of an embodiment of the reflection device of the modulation device of the device of the invention for measuring currents in a high voltage conductor.

The reflection device or reflector means RE, are shown in FIG. 2, comprises an antenna which functions as a reflector R2. The reflector R2 is electrically connected to an oscillating or resonant circuit SK. The oscillating or resonant circuit SK comprises a winding Sp and a capacitance diode $Kd$ $Kd$ connected in parallel with each other. A voltage u is derived from a current i proportional to the current to be measured and is applied to the oscillating circuit SK via a diode D. The voltage u is derived from a resistor W through which the current i to be measured flows or a current proportional to this current.

The capacitance of the capacitance diode $Kd$ of the resonant circuit SK varies in accordance with the magnitude of the current i to be measured or of the voltage u derived from said current. When the capacitance of the capacitance diode $Kd$ $Kd$ varies, the resonant frequency of the resonant circuit SK varies accordingly. The reflection operation of the reflection device RE varies in accordance with the variation of the resonant frequency of the resonant circuit SK.

A transmitter (not shown in FIG. 2) such as, for example, a warble transmitter, transmits UHF oscillations $Us2$ to the reflection device RE. The UHF oscillations $Us$ are reflected by the reflection device RE as reflected oscillations $Ur2$, at a frequency which coincides with the resonant frequency of the resonant circuit SK. The UHF oscillations $Us2$ are modulated at a frequency which varies in accordance with the frequency of oscillation of the resonant circuit SK, which in turn, as hereinbefore described, varies in accordance with the magnitude of the current i to be measured.

The reflected oscillations $Ur2$ are received by a receiver (not shown in FIG. 2) which converts said reflected oscillations into measuring magnitudes or signals corresponding to the magnitude of the current i to be measured. The particularly prevalent frequency in the frequency spectrum reflected by the reflection device RE is a measure of the current i to be measured and is converted in the receiver to the measuring magnitude or signal. The measuring magnitude or signal, which corresponds to the magnitude of the current i to be measured, is provided at an output terminal A of the receiver (FIG. 1).

The accuracy of the measurement results of the current measuring device of the invention, utilizing the reflection device RE of FIG. 2, primarily depends upon the sampling frequency of the warble transmitter. The higher the sampling frequency, the better, and the more precise the determination of the measuring magnitude or signal.

Figure 3:
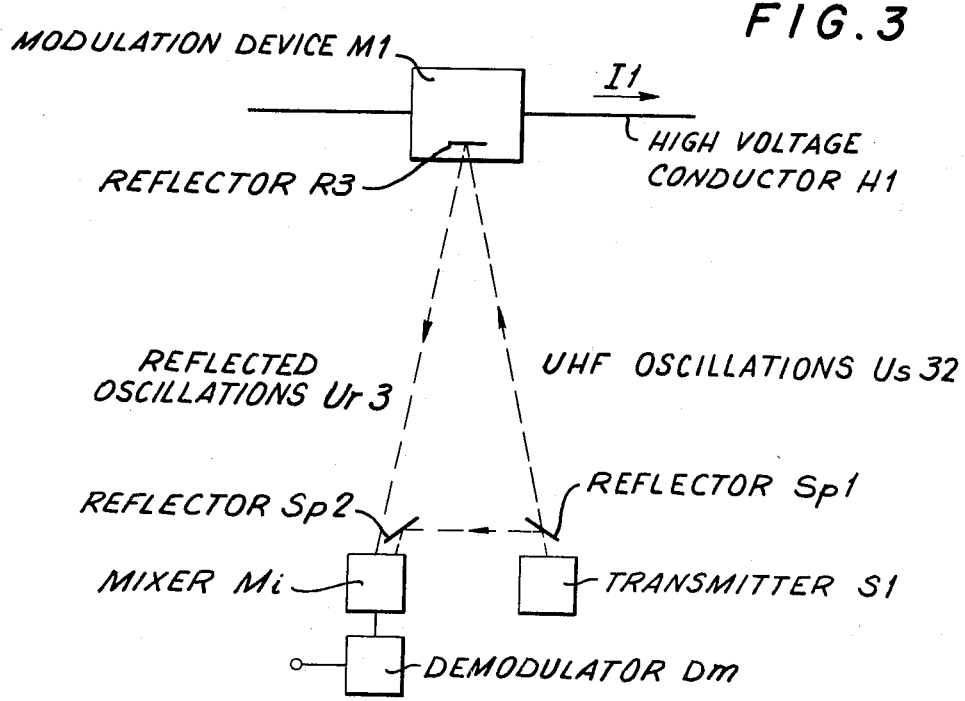
FIG. 3 is a schematic diagram of another embodiment of the device of the invention for measuring currents in a high voltage conductor.

FIG. 3 is another embodiment of the device of the invention for measuring currents in a high voltage conductor. In the embodiment of FIG. 3, a transmitter S1 is connected in series with a semiconductive reflector Sp1. The semiconductive reflector Sp1 reflects oscillations $Us31$ from the transmitter S1 to another reflector Sp2. The reflector Sp2 reflects the oscillations to a mixer or mixing stage Mi. Another portion, $Us32$, of the oscillations issued by the transmitter S1, is directed to a modulation device Ml, arranged at the high voltage side of the device.

The modulation device Ml is charged with current I1 in a high voltage conductor H1. This causes the reflection characteristics of a reflector R3 of the modulation device Ml to be influenced. The oscillations $Us32$ are reflected as modulated oscillations $Ur3$ from the reflector R3 to the low voltage side of the device and delivered to the mixing stage Mi. The mixing stage Mi is connected to a demodulator Dm via an amplifier. The demodulation Dm derives the side band radiation, or beam, in the reflected frequency spectrum.

Figure 4:
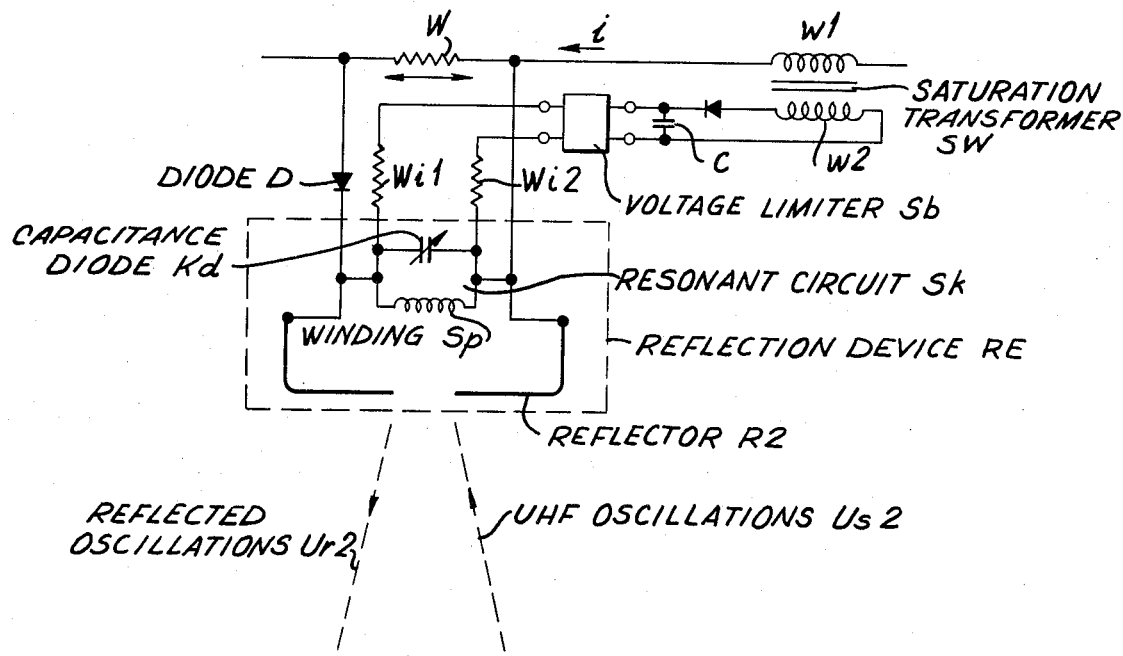
FIG. 4 is a modification of the embodiment of FIG. 2.

FIG. 4 is a modification of the embodiment of FIG. 2. FIG. 4 illustrates how the reflection device, which includes the capacitance diode, as illustrated in FIG. 2, may be supplied with a constant auxiliary voltage. The constant auxiliary voltage may assist in establishing the working point of the capacitance diode. The same components of FIGS. 2 and 4 are identified by the same reference numerals.

A current which is proportional to the current i, to be measured, flows through the primary winding $w1$ of a saturation transformer S.W. The secondary winding $w2$ of the saturation transformer SW, is connected to a rectifier G. The rectifier G is connected in series with a capacitor C. The capacitor C is connected to the capacitance diode $Kd$ via a resistor $Wi1$ and a resistor $Wi2$, preferably via an intermediary connection of a circuit device which functions as a voltage limiter $Sb$.

The current measuring device of the invention has the advantage that, since only passive circuit components are utilized in the reflection device RE, no operating voltage are required at the high voltage side of the device for determining the measured magnitudes. This requires a relatively low output for operating the current measuring device of the invention and considerably simplifies the maintenance and servicing of said current measuring device.

Another advantage of the current measuring device of the invention is that the transmitter channels from the low voltage to the high voltage side and vice versa need not be encapsulated or insulated against the free atmosphere, since the high frequency oscillations are not impeded by either vapor or fog. This advantage is of particular importance when the current measuring device of the invention is operated in the open air.

While the invention has been described by means of a specific example and in a specific embodiment, we do not wish to be limited thereto, for obvious modifications will occur to those skilled in the art without departing from the spirit and scope of the invention.

We claim:

1. A device for measuring currents in a high voltage conductor and for transmitting the measured values from a high voltage side of the device to a low voltage side of the device, said device comprising a modulation device at the high voltage side of the device, said modulation device having reflector means for reflecting high frequency oscillations in accordance with the magnitude of the current to be measured, said reflector means having resonant characteristics corresponding to the magnitude of the current to be measured;

transmitting means at the low voltage side for transmitting high frequency oscillations to the reflector means of said modulation device, said transmitting means having a frequency range and said reflector means having a resonant frequency which varies within the same frequency range as the transmitting means; and receiving means at the low voltage side for converting the oscillations reflected by the reflector means of said modulation device to signals corresponding to the magnitude of the current to be measured.

2. A device as claimed in claim 1, further comprising a high voltage conductor conducting the current to be measured, and wherein the reflector means of said modulation device comprises a resonant circuit coupled to said high voltage conductor and having a resonant frequency which varies in accordance with the magnitude of the current to be measured, and a reflector connected to said resonant circuit.

3. A device as claimed in claim 1, wherein said transmitting means comprises a warble transmitter at the low voltage side of the device and having a sampling frequency determined by the desired accuracy of measurement.

4. A device as claimed in claim 1, wherein said transmitting means transmits high frequency oscillations having a fixed frequency and the reflector means of said modulation device reflects the high frequency oscillations received from said transmitting means as a main radiation having the fixed frequency and as a sideband radiation having a frequency corresponding to the current to be measured.

5. A device as claimed in claim 1, further comprising means for transmitting the high frequency oscillations transmitted by said transmitting means directly and unmodulated to said receiving means and wherein said receiving means demodulates the oscillations reflected by the reflector means of said modulation device by mixing with the oscillations directly transmitted thereto from said transmitting means.

6. A device as claimed in claim 2, wherein the resonant circuit of the reflector means of said modulation device includes a capacitance diode having a capacitance which varies in accordance with the magnitude of the current to be measured thereby varying the resonant frequency of the resonant circuit in accordance with the magnitude of the current to be measured.

7. A device as claimed in claim 6, further comprising rectifier means coupling the capacitance diode of the resonant circuit of the reflector means of said modulation device to said high voltage conductor thereby coupling said capacitance diode to a voltage proportional to the current to be measured.

8. A device as claimed in claim 7, further comprising saturation converting means energized by the current to be measured for providing a constant auxiliary voltage for determining the working point of the capacitance diode of said resonant circuit.

9. A device as claimed in claim 1, wherein of the high frequency oscillations transmitted by the transmitting means, the reflector means reflects that frequency which corresponds to the resonant frequency of said reflector means whereby the reflector means reflects the frequency corresponding to a specific magnitude of the current to be measured since the resonant frequency of the reflector means varies in accordance with the current to be measured.

* * * * *